June 18, 1963 — P. L. SMITH — 3,094,223
LOAD CARRYING APPARATUS
Filed July 19, 1961

INVENTOR.
PAUL L. SMITH
BY
Francis P. Reilly
ATTORNEY.

3,094,223
LOAD CARRYING APPARATUS
Paul L. Smith, Santa Monica, Calif., assignor to Douglas
Aircraft Company, Inc., Santa Monica, Calif.
Filed July 19, 1961, Ser. No. 125,237
5 Claims. (Cl. 214—1)

This invention relates to an improved load carrying apparatus of the type which utilizes a thin film of pressurized air for reducing the coefficient of friction between the load carrying platform, such as a pallet, and the base plane, thereby facilitating movement of the platform along the base plane.

An example of the type of apparatus involved in the present invention is shown in FIGS. 2 and 4 of U.S. Patent No. 2,918,183 issued on December 22, 1959, to T. K. Petersen and P. L. Smith. The relevant devices therein comprise a pallet or a container which are adapted to be moved over a floor-like structure containing a plurality of outlets for pressurized air. As the pallet moves over these outlets, it depresses ball valves protruding above the surface at the outlets, releasing pressurized air to flow between the lowermost surface of the pallet and the floor-like structure. The air serves as a lubricant film which materially reduces the frictional drag of the pallet and load on the floor. In certain load-handling situations, it is desirable that this lubricant film effect be dissipated or nullified for a particular pallet or a series of pallets at a particular location without having to shut off the pressurized air at that location. For example, in freight sorting operations, certain goods frequently must be set aside temporarily at one station while other goods are being shifted about. The relevant devices of U.S. Patent No. 2,918,183 are not very suitable for this type of operation because they can be easily moved as long as they are depressing any of the aforementioned valves. Thus, even a slight incline in the floor or a slight bumping by another pallet will be enough to displace the pallets.

The improved apparatus of the present invention overcomes this deficiency of the relevant devices of U.S. Patent No. 2,918,183 by providing for fluid conduits and valve means in the load carrying platform which will bleed off the pressurized air emanating from the outlets in the floor and destroy the lubricant film effect. In its simplest form, the invention contemplates a plurality of openings generally uniformly distributed over the underside of the platform and extending upwardly through the platform to a manifold or a plenum chamber. Suitable valve means are then provided on the manifold or plenum chamber which will operate to check the flow of pressurized air through the openings, preserving the lubricant film effect, or will serve to vent the pressurized air to the atmosphere, destroying the lubricant film effect. Thus equipped, the improved platform of the present invention makes possible the full utilization of a floor which has a plurality of outlets for pressurized air without resorting to an elaborate and costly system of individual manually controlled valves for the individual outlets in the floor.

The present invention will be better understood by reference to the accompanying drawings in which.

Figure 1:
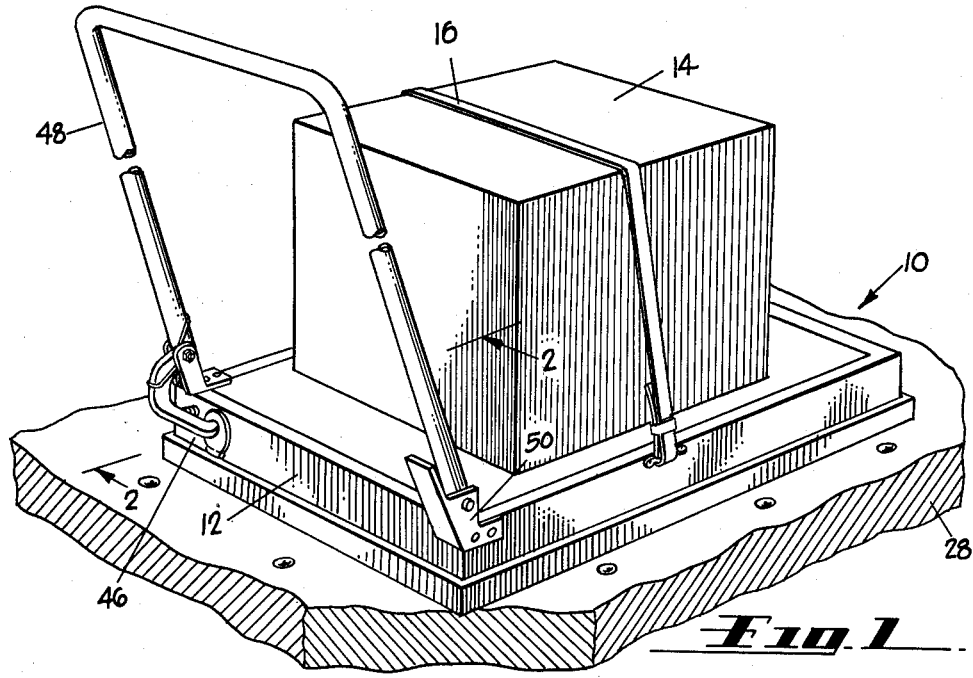
FIGURE 1 is a perspective view of the preferred embodiment of the present load carrying apparatus consisting of a pallet and a floor having multiple outlets for pressurized air.
Figure 2:
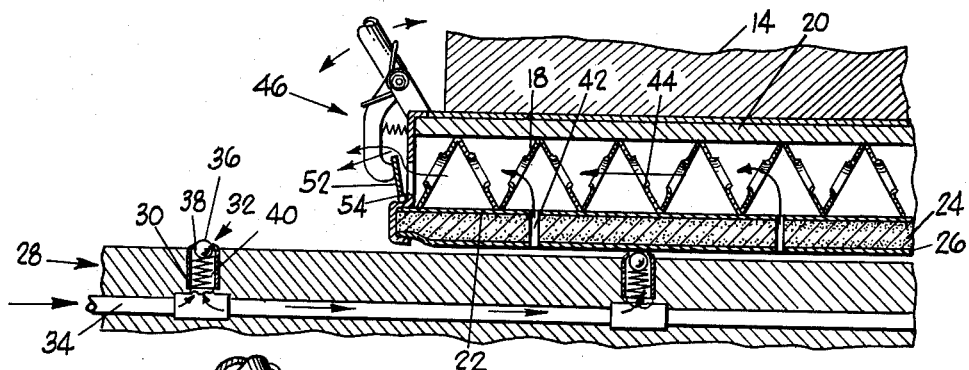
FIGURE 2 is a fragmentary longitudinal section of the pallet and floor shown in FIG. 1.
Figure 3:
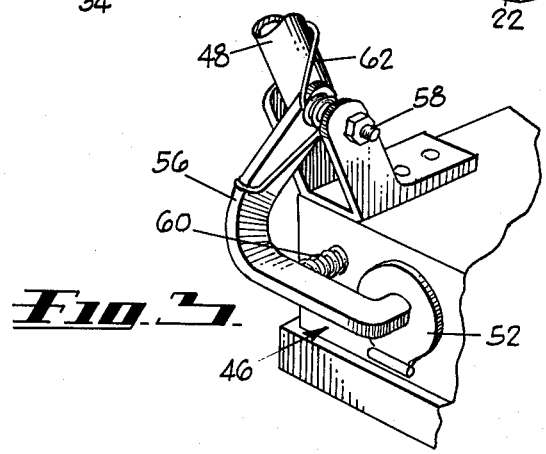
FIGURE 3 is a perspective view of the valve means on the pallet.

In more specific detail, the pallet 10 of the present invention has a rigid load carrying platform or main support 12 for the load 14 which is lashed to the support by conventional, tie-down tensile units 16. Support 12 is made of wood or metal and is strengthened by trusswork 18 between the upper and lower surfaces 20, 22. Surface 22 forms the upper lamina of a laminate construction consisting also of an intermediate layer 24 of a resiliently compressible material and a smooth, flexible lowermost skin 26. Compressible material 24 is made of foam rubber, foam polyurethane and the like, and skin 26 is made from a sheet of plywood, linoleum or the like. The laminate construction permits the pallet to conform to local irregularities in the floor-like structure, as more explicitly described in U.S. Patent No. 2,918,183.

Floor 28 represents a floor that might be used in a freight dock, a warehouse, a truck or the like. It includes, at uniformly distributed points across its expanse, a plurality of pressurized air outlets 30 sealed off by one-way ball valves 32. Pressurized air is supplied to the outlets from a suitable source (not shown) through a piping network 34 in the floor. Ball 36 in the valve 32 protrudes slightly above the floor surface and is normally urged closed against its seat 38 by compression spring 40. When the ball 36 is depressed by the passage of pallet 10 over it, pressurized air is released to the underside of the pallet forming a thin lubricant film which reduces the coefficient of friction between the pallet and the floor and permits the pallet to be moved with ease.

To render the pallet relatively immobile even though it is depressing a number of ball valves, the pallet is provided with a plurality of openings 42 which extend through the laminate construction and which provide a bleed passageway for the pressurized air to the interior of the pallet. Trusswork 18 has perforations 44 allowing for free movement of the air in the pallet interior. In effect, the pallet comprises a plenum chamber. In lieu of the plenum chamber, a manifold may be provided to which all the openings 42 may be connected. The air is vented to the atmosphere by valve means shown generally at 46 at one side of the pallet. The valve means are operable by a diagonally extending pull handle 48 pivotally mounted in brackets 50 affixed at one end of the pallet. Valve means 46 comprise a hinged cap 52 for an outlet 54 adjacent one of the brackets 50, and a lever arm 56 pivotally mounted on pin 58 and actuated by springs 60 and 62. Spring 62 is arranged so that a downward pull on handle 48 will cause lever arm 56 to impinge on cap 52 and maintain it in a closed position. Upon release of the pulling force on handle 48, spring 60 will cause lever arm 56 to move away from the cap so that the latter is free to swing open. Thus, it will be apparent that as long as the pallet is being moved, no bleeding of the pressurized air through the pallet will take place and the lubricating film effect of the air between the pallet and the floor will be maintained. But once movement of the pallet is stopped, the air will bleed to the atmosphere through the pallet and the lubricating film effect will be dissipated.

Although the presently preferred embodiment of the invention has been shown and described, it is to be understood that the invention is susceptible to variation in form and construction within the scope of the appended claims.

I claim:

1. Cargo handling apparatus comprising: a main support having a trusswork reinforcement, said trusswork being perforated for the passage of air; a diagonally extending pull handle at one side of the support; a lower lamina of a sheet-like, flexible material affixed to said support; an intermediate lamina of resiliently compressible material interposed between said main support and lower lamina; a floor-like structure having a generally planar surface across which the main support is pulled with the lower lamina in face-to-face contact with said surface, said intermediate lamina being adapted to locally expand and be compressed upon flexure of the lower lamina when the latter contacts local irregularities in said surface; a plurality of outlets spaced generally uniformly in the surface of said floor-like structure; a source of pressurized gas communicating with said outlets; valve means normally closing said outlets; and operating means for opening said valves, said operating means protruding above the surface of the floor-like structure and being depressible by said lower lamina whereby to effect opening of the valves and a distribution of a lubricating film of pressurized gas between the surface and the lower lamina; a plurality of openings extending through the intermediate and lower laminas and communicating with the perforations in the trusswork; a vent opening at the side of the pallet to which the pull handle is attached; valve means comprising a hinged cap for the vent opening and cooperating lever means operable by the pull handle to restrict the passage of pressurized air through the opening during movement of the main support over the floor-like structure and to vent the pressurized gas to the atmosphere, thereby destroying the lubricating effect of the pressurized gas between the lower lamina and the surface of the floor-like structure.

2. Cargo handling apparatus comprising: a main support adapted to have cargo placed thereon; a lower lamina of a sheet-like, flexible material affixed to said support; an intermediate lamina of resiliently compressible material interposed between said main support and lower lamina; a floor-like structure having a generally planar surface across which the main support is moved with the lower lamina in face-to-face contact with said surface, said intermediate lamina being adapted to locally expand and be compressed upon flexure of the lower lamina when the latter contacts local irregularities in said surface; a plurality of outlets spaced generally uniformly in the surface of said floor-like structure; a source of pressurized gas communicating with said outlets; first valve means normally closing said outlets; and operating means for opening said valve means, said operating means protruding above the surface of the floor-like structure and being depressible by said lower lamina whereby to effect opening of the valve means and a distribution of a lubricating film of pressurized gas between the surface and the lower lamina; a plurality of openings extending through the intermediate and lower laminas of the main support and being interconnected in the support; second valve means controlling the flow of air through the support to the atmosphere whereby when the second valve means is closed the air will provide a substantially friction free lubricating effect between substantially the entire mutually contacting surfaces of the lower lamina and the floor-like structure and whereby when the second valve means is open the air will be vented through the support thereby destroying the lubricating effect.

3. Load carrying apparatus comprising: a load carrying platform having a generally planar underside; a base plane over which the platform is to be moved; a plurality of air outlets in the base plane; a source of pressurized air communicating with said outlets; first valve means for said outlets, said means being operable by passage of the platform thereover to release pressurized air between the underside of the platform and the base plane in a thin lubricating film; a manifold system of air passageways in the platform leading from the underside of the platform to the atmosphere; and second valve means for the system, said second valve means being openable to bleed the pressurized air between the platform and base plane in sufficient amount to dissipate the lubricant film.

4. Load carrying apparatus adapted for use with a base plane having a plurality of air outlets, a source of pressurized air communicating with said outlets, and valve means operable by passage of the apparatus across the base plane to release pressurized air between the lower face of the apparatus and the base plane in a thin lubricating film, said apparatus comprising: a main support having a trusswork reinforcement, said trusswork being perforated for the passage of air; an underside lamina of a sheet-like, flexible material affixed to said support; an intermediate lamina of resiliently compressible material interposed between said main support and underside lamina; a plurality of openings extending through the intermediate and underside laminas and communicating with the perforations in the trusswork; a vent opening in the main support; and manually operable valve means for the vent opening for restricting the passage of pressurized air through the vent opening during movement of the main support over the base plane and to vent the pressurized air to the atmosphere upon the opening of the valve means for the vent opening to destroy the lubricating effect of the pressurized gas between the underside lamina and the base plane.

5. Load carrying apparatus adapted for use with a base plane having a plurality of air outlets, a source of pressurized air communicating with said outlets, and valve means operable by passage of the apparatus thereover to release pressurized air between the underside of the apparatus and the base plane in a thin lubricating film, said apparatus comprising: a main load carrying support; an underside lamina of a sheet-like, flexible material affixed to said support; an intermediate lamina of resiliently compressible material interposed between said main support and underside lamina; a plurality of openings extending through the intermediate and underside laminas of the main support and being interconnected in the support: second valve means controlling the flow of air through the support to the atmosphere whereby when the second valve means is closed the air will provide a friction free lubricating effect between substantially the entire mutually contacting surfaces of the underside lamina and the base plane and whereby when the second valve means is open such lubricating effect is destroyed.

References Cited in the file of this patent
UNITED STATES PATENTS 2,918,183    Petersen _____ Dec. 22, 1959